United States Patent
Yamamoto et al.

(10) Patent No.: US 11,603,592 B2
(45) Date of Patent: Mar. 14, 2023

(54) METALLIC MATERIAL SURFACE TREATMENT AGENT, METALLIC MATERIAL HAVING SURFACE TREATMENT COATING, AND MANUFACTURING METHOD THEREFOR

(71) Applicant: Nihon Parkerizing Co., Ltd., Tokyo (JP)

(72) Inventors: Yusuke Yamamoto, Tokyo (JP); Satoshi Kawabe, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 483 days.

(21) Appl. No.: 16/958,187

(22) PCT Filed: Dec. 20, 2018

(86) PCT No.: PCT/JP2018/046986
§ 371 (c)(1),
(2) Date: Jun. 26, 2020

(87) PCT Pub. No.: WO2019/131436
PCT Pub. Date: Jul. 4, 2019

(65) Prior Publication Data
US 2020/0362461 A1    Nov. 19, 2020

(30) Foreign Application Priority Data

Dec. 27, 2017  (JP) .............................. JP2017-250671

(51) Int. Cl.
| | | |
|---|---|---|
| *C23F 1/10* | (2006.01) | |
| *C23C 22/30* | (2006.01) | |
| *C23C 22/28* | (2006.01) | |
| *C23C 22/34* | (2006.01) | |
| *C23G 1/08* | (2006.01) | |
| *C23G 1/10* | (2006.01) | |
| *C23G 1/12* | (2006.01) | |

(52) U.S. Cl.
CPC .............. *C23C 22/30* (2013.01); *C23C 22/28* (2013.01); *C23C 22/34* (2013.01); *C23G 1/083* (2013.01); *C23G 1/085* (2013.01); *C23G 1/088* (2013.01); *C23G 1/103* (2013.01); *C23G 1/125* (2013.01); *C23C 2222/10* (2013.01)

(58) Field of Classification Search
CPC ................... C23C 22/30; C23F 1/10
See application file for complete search history.

(56) References Cited

U.S. PATENT DOCUMENTS

| | | | | |
|---|---|---|---|---|
| 2009/0020185 A1* | 1/2009 | Inoue | ..................... | C23C 22/30 148/400 |
| 2009/0275702 A1* | 11/2009 | Wakabayashi | ......... | C08G 65/30 528/42 |
| 2009/0280253 A1 | 11/2009 | Church | | |
| 2014/0367029 A1* | 12/2014 | Schmatloch | ............... | C09J 7/50 524/588 |
| 2016/0152861 A1* | 6/2016 | Matsuo | ................. | C08F 220/14 522/120 |
| 2018/0187312 A1 | 7/2018 | Azuma et al. | | |

FOREIGN PATENT DOCUMENTS

| | | |
|---|---|---|
| CN | 101622377 A | 1/2010 |
| JP | 2006-316334 A | 11/2006 |
| JP | 2006-328501 A | 12/2006 |
| JP | 2009-280887 A | 12/2009 |
| JP | 2009-280889 A | 12/2009 |
| WO | WO-2017/002683 A1 | 1/2017 |

OTHER PUBLICATIONS

International Preliminary Report on Patentabitliy and Written Opinion in International Application No. PCT/JP2018/046986 dated Jul. 9, 2020, 5 pages.
Office Action in CN Application No. 201880084076.3 dated Aug. 20, 2021, 16 pages.
Office Action in JP Application No. 201880084076.3 dated Aug. 20, 2021, 16 pages.
Hearing Notice Issued in IN Application No. 202017026979 dated Jul. 23, 2021, 2 pages.
Search Report in International Application No. PCT/JP2018/046986 dated Apr. 2, 2019, 1 page.
Office Action in IN Application No. 202017026979 dated Nov. 5, 2020, 5 pages.

\* cited by examiner

*Primary Examiner* — Thomas T Pham
(74) *Attorney, Agent, or Firm* — Marshall, Gerstein & Borun LLP

(57) ABSTRACT

A surface treatment agent capable of forming a hexavalent chromium-free chemical conversion coating that can provide an excellent corrosion-resistant coating on various metallic materials; a metallic material having a surface treatment coating obtained therefrom; and a method of producing the same. A free fluorine ion-containing surface treatment agent for surface-treating a metallic material, which is obtained by mixing at least one supply source (A) of trivalent chromium-containing ions A; a supply source (B) of ions B that are at least one selected from titanium-containing ions and zirconium-containing ions; a water-soluble or water-dispersible compound (C) containing an alkoxysilyl group, an aromatic ring, a hydroxy group directly bonded to the aromatic ring, and at least one of primary, secondary, tertiary and quaternary amino groups, wherein the alkoxysilyl group is bonded to the nitrogen atom of the amino group directly or via an alkylene group; and a fluorine-containing compound (D) providing fluorine-containing ions.

5 Claims, No Drawings

METALLIC MATERIAL SURFACE TREATMENT AGENT, METALLIC MATERIAL HAVING SURFACE TREATMENT COATING, AND MANUFACTURING METHOD THEREFOR

TECHNICAL FIELD

The present invention relates to: a surface treatment agent for metallic materials; a metallic material having a surface treatment coating formed by the surface treatment agent; and a method of producing the same.

BACKGROUND ART

Conventionally, metallic material surface treatment agents containing trivalent chromium have been developed in a wide range of fields, such as aircraft materials, building materials, and automobile components.

For example, Patent Document 1 discloses a chemical conversion treatment liquid for metallic materials, which contains: a component (A) composed of a water-soluble trivalent chromium compound; a component (B) composed of at least one selected from water-soluble titanium compounds and water-soluble zirconium compounds; a component (C) composed of a water-soluble nitrate compound; a component (D) composed of a water-soluble aluminum compound; and a component (E) composed of a fluorine compound, and in which pH is controlled in a range of 2.3 to 5.0.

Patent Document 2 discloses a chemical conversion treatment liquid which contains prescribed amounts of a specific trivalent chromium compound, a specific zirconium compound, and a specific dicarboxylic acid compound.

Patent Document 3 discloses an aqueous surface treatment agent which contains a specific water-soluble compound (A) and a compound (B) containing at least one element selected from boron, titanium, zirconium, and silicon.

RELATED ART DOCUMENTS

Patent Documents

[Patent Document 1] Japanese Unexamined Patent Application Publication No. 2006-328501
[Patent Document 2] Japanese Unexamined Patent Application Publication No. 2006-316334
[Patent Document 3] Japanese Unexamined Patent Application Publication No. 2009-280889

SUMMARY OF THE INVENTION

Problems to be Solved by the Invention

However, with the metallic material surface treatment agents according to Patent Documents 1 to 3, it is difficult to form a coating having excellent corrosion resistance on various metallic materials.

An object of the present invention is to provide: a surface treatment agent for metallic materials that is capable of forming a coating having excellent corrosion resistance on various metallic materials; a metallic material that has a surface treatment coating formed by the surface treatment agent; and a method of producing the same.

Means for Solving the Problems

The present inventors intensively studied to solve the above-described problems and consequently discovered that a surface treatment agent for metallic materials, which is obtained by mixing: at least one supply source (A) of trivalent chromium-containing ions A; a supply source (B) of ions B that are at least one selected from titanium-containing ions and zirconium-containing ions; a specific water-soluble or water-dispersible compound (C); and a fluorine-containing compound (D) capable of providing fluorine-containing ions, can form a coating having excellent corrosion resistance on various metallic materials, thereby completing the present invention.

In order to solve the above-described problems, the present invention provides, for example:

(1) a surface treatment agent for surface-treating a metallic material, the surface treatment agent obtained by mixing: at least one supply source (A) of trivalent chromium-containing ions A; a supply source (B) of ions B that are at least one selected from titanium-containing ions and zirconium-containing ions; a water-soluble or water-dispersible compound (C) comprising an alkoxysilyl group, an aromatic ring, a hydroxy group directly bonded to the aromatic ring, and at least one amino group selected from primary amino groups, secondary amino groups, tertiary amino groups, and quaternary ammonium groups, wherein the alkoxysilyl group is bonded to the nitrogen atom of the amino group directly or via an alkylene group; and a fluorine-containing compound (D) providing fluorine-containing ions, wherein the surface treatment agent comprises free fluorine ions;

(2) the surface treatment agent according to (1), wherein a ratio of a total mass of a chromium-equivalent mass of the ions A and a metal-equivalent mass of the ions B with respect to a solid content mass of the compound (C), [(A+B)/C], is in a range of 0.03 to 100;

(3) a method of producing a metallic material having a surface treatment coating, the method comprising the contact step of bringing the surface treatment agent according to (1) or (2) into contact with or over a surface of a metallic material;

(4) the method of producing a metallic material having a surface treatment coating according to (3), the method further including, prior to the contact step, the pickling step of pickling the metallic material with a pickling solution that is obtained by mixing at least one selected from a fluorine-containing compound, a sulfuric acid compound, a nitric acid compound, a phosphoric acid compound, an oxycarboxylic acid compound, and a hydrogen peroxide compound; and (5) a metallic material, comprising a surface treatment coating formed by bringing the surface treatment agent according to (1) or (2) into contact with or over a surface of the metallic material.

Advantageous Effects of the Invention

According to the present invention, a surface treatment agent for metallic materials that is capable of forming a coating having excellent corrosion resistance on various metallic materials, a metallic material that has a surface treatment coating formed by the surface treatment agent, and a method of producing the same can be provided.

DESCRIPTION OF EMBODIMENTS

Embodiments of the present invention will now be described. <<Surface Treatment Agent for Metallic Materials<<

The surface treatment agent according to the present embodiment is a chemical agent for surface-treating a metallic material. The surface treatment agent can also be utilized as a chemical conversion agent. The surface treatment agent is obtained by mixing the followings and consequently contains free fluorine ions: at least one supply source (A) of trivalent chromium-containing ions A; a supply source (B) providing ions B that are at least one selected from titanium-containing ions and zirconium-containing ions; a water-soluble or water-dispersible compound (C) containing an alkoxysilyl group, an aromatic ring, a hydroxy group directly bonded to the aromatic ring, and at least one amino group selected from primary amino groups, secondary amino groups, tertiary amino groups, and quaternary ammonium groups, which alkoxysilyl group is bonded to the nitrogen atom of the amino group directly or via an alkylene group; and a fluorine-containing compound (D) providing fluorine-containing ions. This surface treatment agent may be obtained by mixing aqueous medium with these components exclusively or together with other components. The respective components, formulation (mixing amount and mixing ratio), and liquid properties are described below in detail. Examples of the above-described metal-containing ions include metal ions, oxide ions, hydroxide ions, complex ions, and the like. These ions may or may not contain hexavalent chromium; however, considering the effect on the environment, the ions are preferably in the form of containing substantially no hexavalent chromium.

(Supply Source A)

In the surface treatment agent, the supply source (A) is not particularly limited as long as it is capable of providing ions A when mixed in an aqueous medium. Examples of the supply source (A) include chromium (III) fluoride, chromium (III) nitrate, chromium (III) sulfate, chromium (III) phosphate, and the like. These supply sources (A) may be used singly, or in combination of two or more thereof. The content of the ions A in the surface treatment agent is not particularly limited; however, it is usually in a range of 10 to 500 mg/L, preferably in a range of 25 to 300 mg/L, in terms of chromium-equivalent mass concentration.

(Supply Source B)

In the surface treatment agent, the supply source (B) is not particularly limited as long as it is capable of providing ions B when mixed in an aqueous medium. Examples of the supply source (B) include titanium sulfate, titanium oxysulfate, titanium ammonium sulfate, titanium nitrate, titanium oxynitrate, titanium ammonium nitrate, hexafluorotitanic acid, hexafluorotitanium complex salts, zirconium sulfate, zirconium oxynitrate, zirconium ammonium sulfate, zirconium nitrate, zirconium oxynitrate, zirconium ammonium nitrate, hexafluorozirconic acid, hexafluorozirconium complex salts, titanium lactate, titanium acetylacetonate, titanium triethanolaminate, titanium octyl glycolate, tetraisopropyl titanate, tetra-n-butyl titanate, zirconyl acetate, zirconyl lactate, zirconium tetraacetylacetonate, zirconium tributoxyacetylacetonate, tetra-n-butoxy zirconium, tetra-n-propoxy zirconium, and the like. These supply sources (B) may be used singly, or in combination of two or more thereof. The content of the ions B in the surface treatment agent is not particularly limited; however, it is usually in a range of 10 to 500 mg/L, preferably in a range of 25 to 300 mg/L, in terms of metal-equivalent mass concentration (total metal-equivalent mass concentration when two or more supply sources are mixed).

(Compound C)

The compound (C) in the surface treatment agent is a water-soluble or water-dispersible compound that has: an alkoxysilyl group; an aromatic ring; a hydroxy group directly bonded to the aromatic ring; and at least one amino group selected from primary amino groups, secondary amino groups, tertiary amino groups, and quaternary ammonium groups, wherein the alkoxysilyl group is bonded to the nitrogen atom of the amino group directly or via an alkylene group. The compound (C) may be a monomer, a homopolymer, or a copolymer.

The alkoxysilyl group may be any group that has a silicon atom and an alkoxy group directly bonded to the silicon atom, and it is preferably a group that has a silicon atom and at least two alkoxy groups directly bonded to the silicon atom, more preferably a group that has a silicon atom and three alkoxy groups directly bonded to the silicon atom. The alkoxy group is preferably an alkoxy group having 1 to 10 carbon atoms, more preferably a methoxy group or an ethoxy group. There is no particular restriction on a group other than the alkoxy group in the alkoxysilyl group, and preferred examples thereof include a hydrogen atom and alkyl groups having 1 to 10 carbon atoms. Specific examples of the alkoxysilyl group include a dimethylmethoxysilyl group, a methyldimethoxysilyl group, a trimethoxysilyl group, a diethylethoxysilyl group, an ethyldiethoxysilyl group, a triethoxysilyl group, and the like.

When the compound (C) is a homopolymer or a copolymer (when the compound (C) has a repeating unit in its main chain), the compound (C) has preferably 0.01 to 4, more preferably 0.05 to 2, still more preferably 0.1 to 1.5 alkoxysilyl groups per repeating unit.

When the compound (C) is a monomer, the compound (C) has preferably 1 to 4, more preferably 1 to 3, still more preferably 1 to 2 alkoxysilyl groups in one molecule.

The aromatic ring is not particularly limited, and examples thereof include a benzene ring, a naphthalene ring, and an anthracene ring, among which a benzene ring is preferred.

The compound (C) has at least one amino group selected from primary amino groups, secondary amino groups, tertiary amino groups, and quaternary ammonium groups. Thereamong, the compound (C) preferably has a secondary amino group or a tertiary amino group, more preferably has a tertiary amino group.

The compound (C) is a compound that can be obtained by, for example, a method of allowing a compound in which at least one hydroxy group is directly bonded to an aromatic ring, namely a phenolic hydroxy group-containing aromatic compound (a1), an aminosilane (a2), and formaldehyde to react with each other (this method is hereinafter referred to as "first method"), or a method of allowing an aromatic compound (a1) having at least one phenolic hydroxy group, an aminosilane (a2), an amine compound (a3), and formaldehyde to react with each other (this method is hereinafter referred to as "second method").

The compound (C) obtained by the first method or the second method has a structure in which an amino group is bound as a substituent to an aromatic ring of the aromatic compound (a1) via a formaldehyde-derived methylene group by a so-called Mannich reaction. The position of the substituent in the compound (C) is not particularly limited; however, it is preferred that the ortho-position and/or the para-position of a hydroxy group of the aromatic ring be substituted.

The aromatic compound (a1) is not particularly limited as long as it is a compound in which at least one hydroxy group is directly bonded to an aromatic ring, and examples thereof include phenol, bisphenol A, p-vinylphenol, naphthol, o-cresol, m-cresol, p-cresol, and the like. A homopolymer of any of these compounds may be used as well. A polymerization method is not particularly limited, and any known polymerization method, such as radical polymerization, cationic polymerization or polycondensation, can be employed. In addition to the above, a phenol-cresol novolac copolymer, a vinylphenol-styrene copolymer or the like can also be used as the aromatic compound (a1). Moreover, the aromatic compound (a1) may be modified with, for example, a haloepoxide such as epichlorohydrin, a carboxylic acid such as acetic acid, an ester, an amide, an organosilane such as trimethylsilyl chloride, an alcohol, an alkylate such as dimethyl sulfate, and the like. These aromatic compounds (a1) may be used singly, or in combination of two or more thereof.

The aromatic compound (a1) is preferably at least one selected from phenol, bisphenol A, p-vinylphenol, naphthol, a novolac resin, a polybisphenol A, a poly-p-vinylphenol, and a phenol-naphthalene polycondensate, more preferably at least one selected from a novolac resin, a polybisphenol A, a poly-p-vinylphenol, and a phenol-naphthalene polycondensate, still more preferably a poly-p-vinylphenol.

The term "polybisphenol A" used herein refers to a compound represented by the following formula.

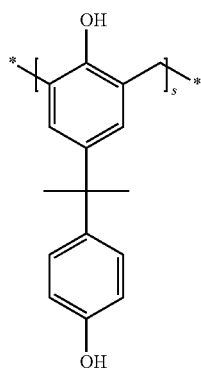

In the above formula, s is an integer of 1 to 2,000, preferably an integer of 5 to 1,000.

Further, the "poly-p-vinylphenol" refers to a compound represented by the following formula. As the poly-p-vinylphenol, one obtained by polymerizing vinylphenol in accordance with a known polymerization method may be used, or a commercially available product may be used. Examples of the commercially available product include MARUKA LYNCUR, which is manufactured by Maruzen Petrochemical Co., Ltd., and the like.

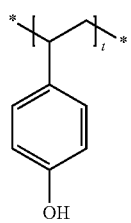

In the above formula, t is an integer of 1 to 4,000, preferably an integer of 10 to 2,000.

The weight-average molecular weight of the aromatic compound (a1) is not particularly limited; however, it is preferably 200 to 1,000,000, more preferably 500 to 500,000, still more preferably 1,000 to 200,000. In the present specification, unless otherwise specified, the "weight-average molecular weight" means a value measured by GPC (gel permeation chromatography) and converted in terms of polystyrene.

The aminosilane (a2) is not particularly limited as long as it is a compound that has a primary amino group and/or a secondary amino group (imino group) and an alkoxysilyl group, and preferred examples of the aminosilane (a2) include compounds represented by the following Formula (2).

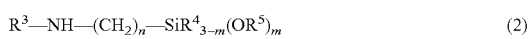

$$R^3-NH-(CH_2)_n-SiR^4{}_{3-m}(OR^5)_m \qquad (2)$$

In Formula (2), $R^3$ represents a hydrogen atom, an alkyl group, an alkenyl group, an alkynyl group, a benzyl group, an aryl group, a hydroxyalkyl group, a dihydroxyalkyl group, a trihydroxyalkyl group, an aminoalkyl group, an alkylaminoalkyl group, a dialkylaminoalkyl group, an acetyl group, or an alkylcarbonyl group. The alkyl group is, for example, preferably an alkyl group having 1 to 10 carbon atoms, more preferably a methyl group, an ethyl group, an i-propyl group, or a t-butyl group. The alkenyl group is, for example, preferably an alkenyl group having 1 to 10 carbon atoms, more preferably an allyl group. The alkynyl group is, for example, preferably an alkynyl group having 1 to 10 carbon atoms, more preferably a propynyl group.

The aryl group is, for example, preferably an aryl group having 1 to 10 carbon atoms, more preferably a phenyl group, a tolyl group, a xylyl group or a naphthyl group, still more preferably a phenyl group. The hydroxyalkyl group is, for example, preferably a hydroxyalkyl group having 1 to 10 carbon atoms, more preferably a 2-hydroxyethyl group. The dihydroxyalkyl group is, for example, preferably a dihydroxyalkyl group having 1 to 10 carbon atoms, more preferably a bis(hydroxyethyl) group. The trihydroxyalkyl group is, for example, preferably a trihydroxyalkyl group having 1 to 10 carbon atoms, more preferably a tris(hydroxyethyl) group. The aminoalkyl group is, for example, preferably an aminoalkyl group having 1 to 10 carbon atoms, more preferably an aminoethyl group.

The alkylaminoalkyl group is, for example, preferably an alkylaminoalkyl group having 1 to 10 carbon atoms, more preferably 2-methylaminoethylene. The dialkylaminoalkyl group is, for example, preferably a dialkylaminoalkyl group having 1 to 10 carbon atoms, more preferably dimethylaminoethylene. The alkylcarbonyl group is, for example, preferably an alkylcarbonyl group having 1 to 10 carbon atoms, more preferably an acetyl group.

In Formula (2), $R^4$ and $R^5$ are each an alkyl group, preferably an alkyl group having 1 to 10 carbon atoms, more preferably a methyl group or an ethyl group. The plural $R^4$s and the plural $R^5$s may each be the same or different.

In Formula (2), n is an integer of 1 to 3, preferably an integer of 2 or 3, more preferably 3.

In Formula (2), m is preferably an integer of 1 to 3, more preferably 2 or 3, still more preferably 3.

Specific examples of the aminosilane (a2) include γ-(phenylamino)propyltrimethoxysilane, γ-aminopropyltriethoxysilane, N-phenyl-3-aminopropyltriethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropylmethyldiethoxysilane, N-(2-aminoethyl)-3-aminopropylmethyldimethoxysilane, N-[2-(N-vinylbenzylamino)ethyl]-3-aminopropyltrimethoxysilane, N-[2-(N-vinylbenzylamino)ethyl]-3-aminopropylmethyldimethoxysilane, N-[2-(N- vinylbenzylamino)ethyl]-3-aminopropyltriethoxysilane, N-[2-(N-vinylbenzylamino)ethyl]-3-aminopropylmethyldiethoxysilane, γ-anilinopropyltrimethoxysilane, γ-anilinopropylmethyldimethoxysilane, γ-anilinopropyltriethoxysilane, γ-anilinopropylmethyldiethoxysilane, N-bis[3-(trimethoxysilyl)propyl]-2-aminovinyltrimethoxysilane, N-(3-acryloxy-2-hydroxypropyl)-3-aminopropyltriethoxysilane, N-(3-methacryloxy-2-hydroxypropyl)-3-aminopropyltriethoxysilane, 4-[(2-aminoethyl)aminomethyl]phenethyltrimethoxysilane, 3-(2-aminoethylamino)isobutyldimethylmethoxysilane, 3-(n-butylamino)propyltrimethoxysilane, 3-(ethylamino)isobutyltrimethoxysilane, N-methyl-3-aminopropyltrimethoxysilane, N-allyl-3-aminopropyltrimethoxysilane, N-cyclohexyl-3-aminopropyltrimethoxysilane, N-phenylaminomethyltriethoxysilane, N-methyl-3-aminopropylmethyldimethoxysilane, bis[3-(trimethoxysilyl)propyl]amine, N,N'-bis[3-(trimethoxysilyl)propyl]ethylenediamine, N,N'-bis[3-(triethoxysilyl)propyl]urea, bis[3-(methyldiethoxysilyl)propyl]amine, 3-ureidopropyltriethoxysilane, 3-ureidopropyltrimethoxysilane, N,N-dioctyl-N'-[3-(triethoxysilyl)propyl]urea, N-(3-triethoxysilylpropyl)gluconamide, N-(3-triethoxysilylpropyl)-t-butyl carbamate, N-[3-(triethoxysilyl)propyl] carbamate, 1,3-divinyltetramethyldisilazane, N-[3-(trimethoxysilyl)propyl]polyethylene imine, 3-(2,4-dinitrophenylamino)propyltriethoxysilane, N-[3-(triethoxysilyl)propyl]-p-nitrobenzamine, and the like. These aminosilanes may be used singly, or in combination of two or more thereof. Thereamong, it is preferred to use at least one aminosilane selected from γ-(phenylamino)propyltrimethoxysilane, γ-aminopropyltriethoxysilane, N-(2-aminoethyl)-3-aminopropyltrimethoxysilane, γ-aminopropylmethyldimethoxysilane, N-methyl-3-aminopropyltrimethoxysilane, N-cyclohexyl-3-aminopropyltrimethoxysilane, bis[3-(trimethoxysilyl)propyl]amine, and N-allyl-3-aminopropyltrimethoxysilane.

The amount of the aminosilane (a2) to be used in the first method is preferably 1 to 1,200 parts by mass, more preferably 2 to 600 parts by mass, still more preferably 3 to 300 parts by mass, with respect to 100 parts by mass of the aromatic compound (a1).

The amount of the aminosilane (a2) to be used in the second method is preferably 1 to 1,200 parts by mass, more preferably 2 to 600 parts by mass, still more preferably 3 to 300 parts by mass, with respect to 100 parts by mass of the aromatic compound (a1).

The amine compound (a3) is not particularly limited as long as it is a compound that has a primary amino group and/or a secondary amino group (imino group), and preferred examples thereof include compounds represented by the following Formula (1).

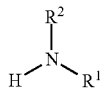

(1)

In Formula (1), $R^1$ and $R^2$ are each the same as $R^3$ of the above-described Formula (2), and $R^1$ and $R^2$ are optionally bonded with each other to form a morpholino group.

Specific examples of compounds that can be used as the amine compound (a3) include: alkylamines, such as methylamine, ethylamine, isopropylamine, dimethylamine, diethylamine, and diisopropylamine; alkanolamines, such as monoethanolamine, diethanolamine, 2-methylaminoethanol, 2-ethylaminoethanol, 3-methylamino-1,2-propanediol, and N-methylglucamine; aromatic amines, such as aniline, p-methylaniline, and N-methylaniline; unsaturated amines, such as vinylamine and allylamine; heterocyclic amines, such as pyrrole, pyrrolidine, imidazole, indole, morpholine, and piperazine; ethylenediamine; N,N-dimethylethylenediamine; ethylenediamine; sym-dimethylethylenediamine; 1,6-hexamethylenediamine; 1,3-propanediamine, and the like. These compounds may be used singly, or in combination of two or more thereof. Thereamong, it is preferred to use at least one amine compound selected from 2-methylaminoethanol, monoethanolamine, diethanolamine, 3-methylamino-1,2-propanediol, N-methylglucamine, N-methyl-1,3-propanediamine, N-methylaniline, ethylamine, diethylamine, allylamine, benzylamine, 2-ethylaminoethanol, ethylenediamine, sym-dimethylethylamine, and morpholine.

The amount of the amine compound (a3) to be used in the second method is preferably 0.2 to 360 parts by mass, more preferably 0.4 to 270 parts by mass, still more preferably 0.6 to 180 parts by mass, with respect to 100 parts by mass of the aromatic compound (a1).

Formaldehyde used in the above-described reaction may be diluted with a solvent.

The solvent is not particularly limited as long as it is not involved in the reaction, and examples thereof include: water; alcohol-based solvents, such as methanol and ethanol; ether-based solvents, such as tetrahydrofuran and 1,4-dioxane; halogen-based solvents, such as dichloromethane and chloroform; and ketone-based solvents, such as acetone.

The amount of formaldehyde to be used in the first method is, in terms of the molar ratio of formaldehyde with respect to the amino group(s) of the aminosilane (a2) (formaldehyde/amino group(s)), preferably 1 to 100, more preferably 2 to 50.

The amount of formaldehyde to be used in the second method is, in terms of the molar ratio of formaldehyde with respect to a total amount of the amino group(s) of the aminosilane (a2) and the amino group(s) of the amine compound (a3) (formaldehyde/amino groups), is preferably 1 to 100, more preferably 2 to 50.

One preferred embodiment of the compound (C) is a polymer containing a repeating unit represented by the following Formula (3).

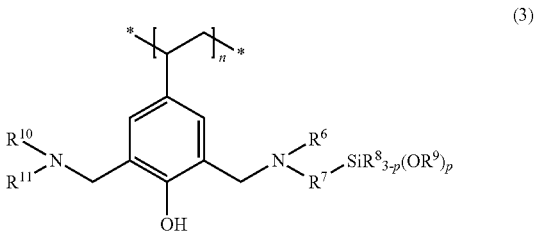

(3)

In Formula (3), $R^6$ is the same as $R^3$ of the above-described Formula (2). $R^7$ is a single bond or an alkylene group, preferably an alkylene group having 1 to 10 carbon atoms, more preferably a trimethylene group ($-(CH_2)_3-$). $R^8$ and $R^9$ are each an alkyl group, preferably an alkyl group having 1 to 10 carbon atoms, more preferably a methyl group or an ethyl group. The plural $R^8$s and the plural $R^9$s may each be the same or different. $R^{10}$ and $R^{11}$ are each the same as $R^3$ of the above-described Formula (2), and $R^{10}$ and $R^{11}$ are optionally bound with each other to form a morpholino group. Further, p is an integer of 1 to 3, preferably 2 or 3, more preferably 3.

The above-described polymer may also contain a repeating unit other than the one represented by Formula (3). In one preferred embodiment, the polymer is constituted by the repeating unit represented by Formula (3) and at least one repeating unit selected from a repeating unit represented by the following Formula (5), a repeating unit represented by the following Formula (6), a repeating unit represented by the following Formula (7), a repeating unit represented by the following Formula (8), and a repeating unit represented by the following Formula (9). The polymer may further contain a repeating unit other than the repeating units represented by any one of Formulae (3) and (5) to (9).

(5)
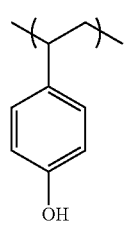

(6)
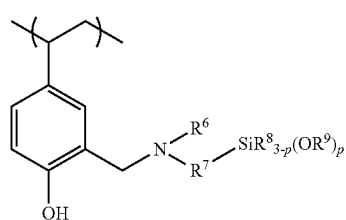

(7)
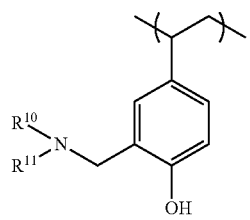

(8)
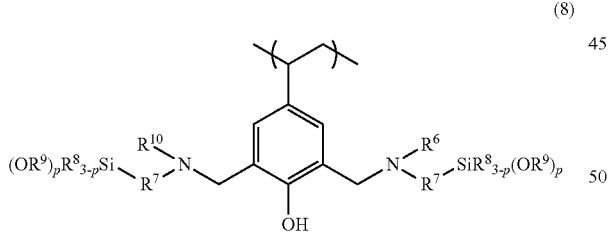

(9)
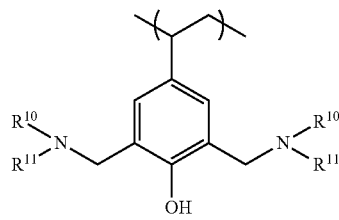

In Formulae (5) to (9), $R^6$, $R^7$, $R^8$, $R^9$, $R^{10}$, $R^{11}$ and p are the same as $R^6$, $R^7$, $R^8$, $R^9$, $R^{10}$, $R^{11}$ and p of the above-described Formula (3), respectively.

A method of producing the above-described polymer is not particularly limited, and preferred examples thereof include a method of obtaining the polymer by allowing a poly-p-vinylphenol, the aminosilane (a2), the amine compound (a3), and formaldehyde to react with each other.

One preferred specific example of the above-described polymer is a polymer that contains a repeating unit represented by the following Formula (4) (hereinafter, referred to as "compound of the first embodiment").

(4)
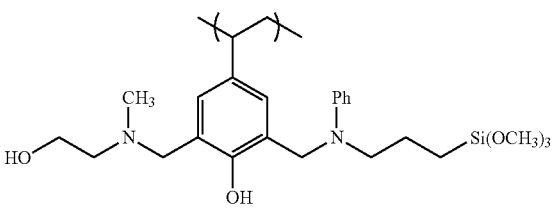

The compound of the first embodiment may also contain a repeating unit other than the one represented by Formula (4). In one preferred embodiment, the compound of the first embodiment is a polymer constituted by the repeating unit represented by Formula (4) and at least one repeating unit selected from a repeating unit represented by the following Formula (10), a repeating unit represented by the following Formula (11), a repeating unit represented by the following Formula (12), a repeating unit represented by the following Formula (13), and a repeating unit represented by the following Formula (14). The compound of the first embodiment of the present invention may further contain a repeating unit other than the repeating units represented by any one of Formulae (4) and (10) to (14).

(10)
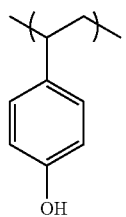

(11)
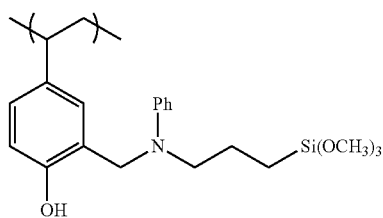

(12)
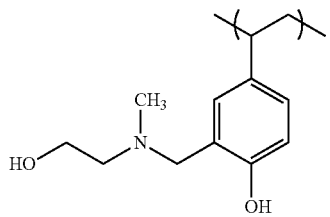

(13)

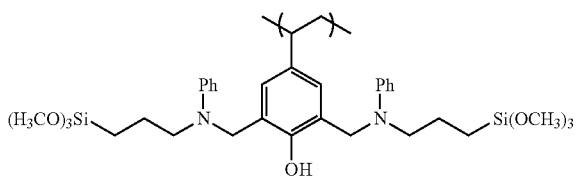

(14)

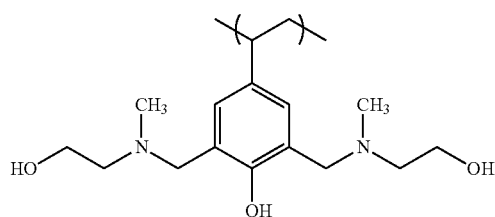

A method of producing the compound of the first embodiment is not particularly limited, and preferred examples thereof include a method of obtaining the above-described polymer by allowing a poly-p-vinylphenol, γ-(phenylamino)propyltrimethoxysilane, 2-methylaminoethanol, and formaldehyde to react with each other.

Other preferred embodiment of the compound (C) is, for example, a compound obtained by allowing a poly-p-vinylphenol; at least one aminosilane selected from γ-(phenylamino)propyltrimethoxysilane, γ-aminopropyltriethoxysilane, N-(2-aminoethyl)-3-aminopropyltrimethoxysilane, γ-aminopropylmethyldimethoxysilane, N-methyl-3-aminopropyltrimethoxysilane, N-cyclohexyl-3-aminopropyltrimethoxysilane, bis[3-(trimethoxysilyl)propyl]amine and N-allyl-3-aminopropyltrimethoxysilane; at least one amine compound selected from 2-methylaminoethanol, monoethanolamine, diethanolamine, 3-methylamino-1,2-propanediol, N-methylglucamine, N-methyl-1,3-propanediamine, N-methylaniline, ethylamine, diethylamine, allylamine, benzylamine, 2-ethylaminoethanol, ethylenediamine, sym-dimethylethylamine and morpholine; and formaldehyde; to react with each other in a solvent (this compound is hereinafter referred to as "compound of the second embodiment").

A method of producing the compound of the second embodiment is not particularly limited, and preferred examples thereof include a method of obtaining the compound of the second embodiment by allowing the above-described poly-p-vinylphenol, the above-described aminosilane, the above-described amine compound, and formaldehyde to react with each other in a solvent. The compound of the second embodiment has a structure in which an amino group is bonded as a substituent to each aromatic ring of the poly-p-vinylphenol via a formaldehyde-derived methylene group by a so-called Mannich reaction. In the compound of the second embodiment, the position of the substituent on the aromatic ring is not particularly limited; however, it is preferred that the ortho-position of a phenolic hydroxy group be substituted.

The amount of the aminosilane to be used in the above-described reaction is preferably 1 to 1,200 parts by mass, more preferably 2 to 600 parts by mass, still more preferably 3 to 300 parts by mass, with respect to 100 parts by mass of the poly-p-vinylphenol. The amount of the amine compound to be used in the above-described reaction is preferably 0.2 to 360 parts by mass, more preferably 0.4 to 270 parts by mass, still more preferably 0.6 to 180 parts by mass, with respect to 100 parts by mass of the poly-p-vinylphenol. The amount of formaldehyde to be used in the above-described reaction is preferably 0.3 to 300 parts by mass, more preferably 0.6 to 200 parts by mass, still more preferably 0.9 to 150 parts by mass, with respect to 100 parts by mass of the poly-p-vinylphenol.

The solvent is not particularly limited as long as it is not involved in the reaction, and examples thereof include: water; alcohol-based solvents, such as methanol and ethanol; ether-based solvents, such as tetrahydrofuran and 1,4-dioxane; halogen-based solvents, such as dichloromethane and chloroform; and ketone-based solvents, such as acetone.

The solvent is used in an amount of preferably 0 to 10,000 parts by mass, more preferably 10 to 5,000 parts by mass, with respect to 100 parts by mass of the poly-p-vinylphenol.

In the method of producing the compound of the second embodiment, the reaction rate can be improved and the reaction time can be shortened by further adding a catalyst. Examples of the catalyst include an acid catalyst, a base catalyst, a Lewis acid catalyst, and the like.

Specific examples of the acid catalyst include: inorganic acids, such as hydrochloric acid, hydrochloric gas, sulfuric acid, fuming sulfuric acid, nitric acid, concentrated nitric acid, and phosphoric acid; organic acids, such as p-toluenesulfonic acid, trifluoromethanesulfonic acid, formic acid, and acetic acid. Specific examples of the base catalyst include sodium hydroxide, potassium hydroxide, sodium hydride, pyridine, triethylamine, and lithium diisopropylamide; and the like.

Specific examples of the Lewis acid catalyst include aluminum chloride, titanium chloride, lanthanum trifluoromethanesulfonate, scandium trifluoromethanesulfonate, ytterbium trifluoromethanesulfonate, and the like.

The amount of the catalyst to be added is not particularly limited; however, it is preferably 1 to 300 parts by mass, more preferably 2 to 150 parts by mass, with respect to 100 parts by mass of the poly-p-vinylphenol.

In the method of producing the compound of the second embodiment, the reaction temperature is not particularly limited; however, it is preferably 0 to 150° C., more preferably 20 to 100° C.

In the method of producing the compound of the second embodiment, the reaction time is also not particularly limited; however, it is preferably, for example, about 24 hours when the reaction temperature is 80° C., or about 7 days when the reaction temperature is 23° C.

The method of producing the compound of the second embodiment will now be described concretely. It is noted here, however, that the method of producing the compound of the second embodiment according to the present invention is not limited thereto. First, a poly-p-vinylphenol and the above-described solvent are mixed and sufficiently dissolved. Next, to the resulting mixture, the above-described amine compound, the above-described aminosilane, formaldehyde and, as required, the above-described catalyst are sequentially added dropwise with stirring at room temperature. This mixture is heated to 80° C. and stirred for 24 hours, whereby the compound of the present embodiment can be obtained. In this process, the order of adding the above-described aminosilane, amine compound, formaldehyde and catalyst is not particularly limited; however, it is preferred to add formaldehyde after adding the aminosilane and the amine compound. The catalyst is preferably added after the addition of formaldehyde.

The compound of the second embodiment obtained by the above-described method can be purified by a known method. The purification can be performed by, for example, precipitation in a solvent that does not dissolve the compound of interest, distillation at normal pressure or under reduced pressure, or the use of chromatography.

The molecular weight or weight-average molecular weight of the compound (C) is not particularly limited; however, it is preferably 200 to 1,000,000, more preferably 500 to 500,000, still more preferably 1,000 to 200,000.

A method of producing the compound (C) is not particularly limited, and preferred examples thereof include a method of producing the compound of the first embodiment or the second embodiment in accordance with the above-described second method.

As for the content of the compound (C) in the surface treatment agent, a ratio of a total mass of a chromium-equivalent mass of the ions A and a metal-equivalent mass of the ions B with respect to a solid content mass of the compound (C), [(A+B)/C], is in a range of 0.03 to 100, preferably in a range of 0.1 to 50, more preferably in a range of 0.1 to 24. The ratio [(A+B)/C] is particularly preferably in a range of higher than 3. In these ranges, more optimum coating performance can be attained.

(Fluorine-Containing Compound D)

The fluorine-containing compound (D) is not particularly limited as long as it is a compound that is capable of providing fluorine-containing ions when mixed in an aqueous medium, and examples of the fluorine-containing compound (D) include hydrofluoric acid, ammonium fluoride, chromium fluoride, hexafluorotitanic acid, hexafluorotitanium complex salts, hexafluorozirconic acid, hexafluorozirconium complex salts, magnesium fluoride, aluminum fluoride, hexafluorosilicic acid, sodium fluoride, potassium fluoride, and the like. The fluorine-containing compound (D) may be used singly, or two or more thereof may be used in combination.

Free fluorine ions may be provided by the supply source (A) and/or the supply source (B) and, in this case, the supply source (A) and/or the supply source (B) is/are the same compound as the fluorine-containing compound (D). Alternatively, free fluorine ions may be provided by, in addition to the fluorine-containing compound (D), the supply source (A) and/or the supply source (B) that is/are a compound(s) different from the fluorine-containing compound (D). In other words, a part or the entirety of the fluorine-containing compound (D) may be in common with at least a part of the supply source (A) and/or the supply source (B). In the surface treatment agent, the fluorine-equivalent mass concentration of free fluorine ions is preferably 3 to 100 mg/L, more preferably 5 to 70 mg/L. It is noted here that the free fluorine ion concentration is defined as a value determined by the method described in Japanese Patent Publication (Kokoku) No. H06-095086 (Japanese Unexamined Patent Application Publication No. S58-211644).

(Other Component E)

Other component (E) is not particularly limited as long as it does not impair the effects of the present invention, and examples thereof include: compounds containing a metal element, such as vanadium, molybdenum, tungsten, manganese, cerium, magnesium, calcium, cobalt, nickel, strontium, lithium, niobium, yttrium, and bismuth; and pH modifiers. These components may be used singly, or in combination of two or more thereof.

Further, a metallic material-derived component generated by etching of a metallic material, such as iron and aluminum, may be intentionally incorporated at the time of bringing the metallic material into contact with the surface treatment agent.

The pH of the surface treatment agent according to the present invention is not particularly limited; however, it is preferably 2.3 to 5.0, more preferably 3.0 to 4.5. In the present specification, the pH means a value measured at a temperature at which the surface treatment agent or the below-described pickling solution is brought into contact with or over a surface of a metallic material. The pH can be measured using, for example, a portable electrical conductivity/pH meter (WM-32EP, manufactured by DKK-TOA Corporation).

<<Method of Producing Surface Treatment Agent for Metallic Materials>>

The surface treatment agent according to the present invention can be obtained by mixing appropriate amounts of the above-described supply source (A) of ions A, supply source (B) of ions B, compound (C), and fluorine-containing compound (D) with an aqueous medium, and then stirring the resulting mixture. In the production, a solid supply source may be added to the aqueous medium, or the solid supply source may be dissolved in the aqueous medium in advance and then added as an aqueous medium solution. The pH of the resulting surface treatment agent is preferably adjusted with a pH modifier, such as nitric acid, hydrofluoric acid, ammonium hydrogen carbonate, and aqueous ammonia; however, the pH modifier is not limited to these components. Such a pH modifier may be used singly, or two or more thereof may be used in combination.

As the aqueous medium, for example, water or a mixture of water and a water-miscible organic solvent, which contains not less than 50% by mass of water, can be used. The water-miscible organic solvent is not particularly limited as long as it is an organic solvent that is miscible with water, and examples thereof include: alcohol-based solvents, such as methanol and ethanol; ketone-based solvents, such as acetone; amide-based solvents, such as N,N'-dimethylformamide and dimethylacetamide; ether-based solvents, such as ethylene glycol monobutyl ether and ethylene glycol monohexyl ether; pyrrolidone-based solvents, such as 1-methyl-2-pyrrolidone and 1-ethyl-2-pyrrolidone; and the like. These water-miscible organic solvents may be mixed with water singly, or in combination of two or more thereof.

<<Method of Producing Metallic Material Having Surface Treatment Coating>>

A method of producing a metallic material having a surface treatment coating according to the present embodiment includes the contact step of bringing the surface treatment agent of the present embodiment into contact with or over a surface of a metallic material. By this, a surface treatment coating is formed on or over the surface of the metallic material. In addition, pretreatment steps, such as the degreasing step and the pickling step, may be performed prior to the contact step. The water-washing step may be performed after each step, and the drying step may be performed after each water-washing step.

(Degreasing Step)

In the method of producing a metallic material having a surface treatment coating according to the present embodiment, it is preferred to perform, prior to the contact step, the degreasing step of bringing a known degreasing agent into contact with or over the surface of the metallic material. A method of performing the degreasing step is not particularly limited, and examples thereof include solvent degreasing, alkali degreasing, and the like.

(Pickling Step)

In the method of producing a metallic material having a surface treatment coating according to the present embodiment, it is preferred to perform, prior to the contact step, the pickling step of bringing a specific pickling solution into contact with or over the surface of the metallic material. Specifically, as the pickling solution, it is preferred to use a pickling solution that is obtained by mixing at least one selected from a fluorine-containing compound, a sulfuric acid compound, a nitric acid compound, a phosphoric acid compound, an oxycarboxylic acid compound and a hydrogen peroxide compound, and a combination of (α) a sulfuric acid compound, a nitric acid compound, a phosphoric acid compound, an oxycarboxylic acid compound and/or a hydrogen peroxide compound and (β) a fluorine-containing compound is more preferred. It is noted here that the fluorine-containing compound is the same as the above-described fluorine-containing compound (D), and it may be, for example, preferably hydrofluoric acid or a water-soluble hydrofluoric acid salt, more preferably hydrofluoric acid. The sulfuric acid compound is a compound capable of providing a sulfate ion into the pickling solution, and it may be, for example, preferably sulfuric acid, a sulfuric acid salt, and a sulfuric acid ester, more preferably sulfuric acid. The nitric acid compound is a compound capable of providing a nitrate ion into the pickling solution, and it may be, for example, preferably nitric acid, a nitric acid salt, and a nitric acid ester, more preferably nitric acid. The phosphoric acid compound is a compound capable of provide a phosphate ion into the pickling solution, and it may be, for example, phosphoric acid, a phosphoric acid salt, and a phosphoric acid ester, preferably phosphoric acid. The oxycarboxylic acid compound may be, for example, oxycarboxylic acid and an oxycarboxylic acid salt, more preferably oxycarboxylic acid. The hydrogen peroxide compound may be, for example, hydrogen peroxide, a hydrogen peroxide salt, and the like, preferably hydrogen peroxide. The pH of the pickling solution is preferably 1 to 5 at 25° C.

A method of performing the pickling step is not particularly limited, and examples thereof include an immersion method, a spray method, a flow-coating method, and the like. The concentration of the pickling solution and the contact time between the pickling solution and the metallic material are not particularly limited; however, they are controlled such that the weight of the metallic material etched by the contact with the pickling solution per unit area is in a range of preferably 0.1 to 10.0 g/m$^2$, more preferably 0.1 to 5.0 g/m$^2$.

(Contact Step)

In the method of producing a metallic material having a surface treatment coating using the surface treatment agent of the present embodiment, the contact step is the step of bringing the surface treatment agent into contact with or over the surface of the metallic material for 10 to 600 seconds at 40 to 70° C. After this step, as required, the metallic material may be washed with water and then with deionized water, followed by drying. The drying temperature is not particularly limited; however, it is preferably in a range of 50 to 140° C. A method of bringing the surface treatment agent into contact with or over the surface of the metallic material is not particularly limited, and examples thereof include an immersion method, a spray method, a flow-coating method, and the like.

(Metallic Material to Be Treated)

A metallic material to be treated with the surface treatment agent of the present invention is not particularly limited, and examples thereof include aluminum, aluminum alloys, cold-rolled steel sheets, hot-rolled steel sheets, hot-dip galvanized steel sheets, electrogalvanized steel sheets, galvannealed steel sheets, aluminum-plated steel sheets, aluminum-zincalloyed coated steel sheets, stainless steel sheets, copper sheets, titanium sheets, magnesium sheets, nickel sheets, and the like. Thereamong, the surface treatment agent of the present invention is effective on aluminum and aluminum alloys, particularly aluminum die-cast materials which have a thick surface oxide film and on the surfaces of which various kinds of alloy components are segregated.

<<Metallic Material Having Surface Treatment Coating>>

On a metallic material having a surface treatment coating which is produced by the method of producing a metallic material having a surface treatment coating according to the present invention, the amount of adhered surface treatment coating is preferably 1 to 100 mg/m$^2$ in terms of carbon-equivalent mass (M) per unit area, and 1 to 200 mg/m$^2$ in terms of a total mass (N) of Cr, Ti and Zr per unit area.

The metallic material having a surface treatment coating according to the present embodiment has excellent corrosion resistance even without the coating step for coating the surface treatment coating in particular; however, the coating step may be performed as well.

The coating step is not particularly limited and can be performed by, for example, a coating method such as aqueous coating, solvent coating, powder coating, anionic electrodeposition coating, and cationic electrodeposition coating, using a known paint composition.

Examples

Examples and Comparative Examples of the present invention will now be described. It is noted here, however, that the present invention is not limited thereto by any means.

<<Production of Surface Treatment Agents for Metallic Materials>>

<Synthesis of Compound (C)>

In a reaction apparatus (1-L separable flask) equipped with a stirrer, an aromatic compound (a1) and a solvent were added in the respective amounts shown in the following Table 1, and then the aromatic compound (a1) was sufficiently dissolved. To the resulting mixture, an amine compound (a3), an aminosilane (a2), a 37%-by-mass aqueous formaldehyde solution, and a catalyst were sequentially added dropwise at room temperature in the respective amounts shown in the following Table 1, followed by 48-hour stirring at 80° C. Thereafter, only a polymer component was precipitated with an addition of water and then purified by filtration, whereby compounds C1 to C3 corresponding to the above-described compound (C) were each obtained. It is noted here that C4 to C6 shown in Table 1 are compounds that do not correspond to the compound (C) contained in the surface treatment agent of the present invention.

The symbols used in Table 1 have the following meanings.

a1: poly-p-vinylphenol (MARUKA LYNCUR, manufactured by Maruzen Petrochemical Co., Ltd.)
a2: γ-(phenylamino)propyltrimethoxysilane
a3: 2-methylaminoethanol
a4: ethanol
a5: acetic acid

TABLE 1

| | Synthesis of Compounds | | | | | | | | | |
|---|---|---|---|---|---|---|---|---|---|---|
| | Aromatic compound (a1) | | Aminosilane (a2) | | Amine compound (a3) | | Solvent | | Catalyst | |
| Symbol | Type | Amount (g) | Type | Amount (g) | Type | Amount (g) | Type | Amount (g) | Formaldehyde Amount (g) | Type | Amount (g) |
| C1 | a1 | 100 | a2 | 42  | a3 | 105 | a4 | 600 | 130 | a5 | 27 |
| C2 | a1 | 100 | a2 | 350 | a3 | 105 | a4 | 600 | 130 | a5 | 27 |
| C3 | a1 | 100 | a2 | 42  | a3 | 210 | a4 | 600 | 130 | a5 | 27 |
| C4 | a1 | 100 | —  | —   | a3 | 105 | a4 | 600 | 130 | a5 | 27 |
| C5 | a1 | 100 | a2 | 42  | —  | —   | a4 | 600 | 130 | a5 | 27 |
| C6 | a1 | 100 | a2 | 42  | a3 | 105 | a4 | 600 | —   | a5 | 27 |

<Components Used for Preparation of Surface Treatment Agents for Metallic Materials>

As shown in Table 2, raw materials A1 to A3 were each used as a supply source (A) of ions A; raw materials B1 and B2 were each used as a supply source (B) of ions B; a raw material D1 was used as a fluorine-containing compound (D); and raw materials E1 to E4 were each used as a component (E).

TABLE 2

| Symbol | Name | Manufacturer |
|---|---|---|
| A1 | Chromium (III) fluoride trihydrate | Showa Kagaku Co., Ltd. |
| A2 | Chromium (III) nitrate nonahydrate | Wako Pure Chemical Industries, Ltd. |
| A3 | Chromium (III) sulfate | Junsei Chemical Co., Ltd. |
| B1 | Hexafluorozirconic acid | Morita Chemical Industries Co., Ltd. |
| B2 | Titanium (IV) sulfate | Wako Pure Chemical Industries, Ltd. |
| D1 | Hydrofluoric acid | Wako Pure Chemical Industries, Ltd. |
| E1 | Ammonium molybdate | Yoneyama Yakuhin Kogyo Co., Ltd. |
| E2 | Cerium (III) nitrate hexahydrate | Wako Pure Chemical Industries, Ltd. |
| E3 | Nickel carbonate | Tokyo Chemical Industry Co., Ltd. |
| E4 | Vanadyl acetylacetonate | Wako Pure Chemical Industries, Ltd. |

<Surface Treatment Agents for Metallic Materials>

The raw materials shown in Tables 1 and 2 were added and mixed with water at the respective concentrations shown in Table 3 to obtain the surface treatment agents of Examples 1 to 20 and Comparative Examples 1 to 8.

In Table 3, the "amount" of the supply source (A) represents a chromium-equivalent mass concentration; the "amount" of the supply source (B) represents a metal-equivalent mass concentration; the "amount" of the component (E) represents a metal-equivalent mass concentration; and the "free fluorine ion concentration" represents a fluorine-equivalent mass concentration. The free fluorine ion concentration was measured as follows. Further, the pH of each treatment liquid is shown in Table 3.

<Measurement of Free Fluorine Ion Concentration>

The free fluorine ion concentration was measured using a commercially available fluoride ion meter (ion electrode: fluoride ion composite electrode F-2021, manufactured by DKK-TOA Corporation).

<<Production of Metallic Materials Having Surface Treatment Coating>>

Using each of the surface treatment agents of Examples 1 to 20 and Comparative Examples 1 to 8, the below-described metallic material was treated to produce metallic materials having a surface treatment coating as Production Examples 1 to 25 and Comparative Production Examples 1 to 8.

The treatment method and the treatment conditions are as follows.

For each of the metallic materials having a surface treatment coating that were produced in Production Examples 1 to 25 and Comparative Production Examples 1 to 8, the amount of the adhered surface treatment coating was measured in terms of total metal mass and carbon-equivalent mass per unit area by the below-described respective methods. The measurement results are shown in Table 4. In Table 4, (N) represents a total mass of Cr, Ti and Zr, and (M) represents a carbon-equivalent mass.

Further, for each of the metallic materials having a surface treatment coating that were produced in Production Examples 1 to 25 and Comparative Production Examples 1 to 8, a corrosion resistance (uncoated mode) test was conducted as described below to evaluate the corrosion resistance of the surface treatment coating. The results thereof are shown in Table 5.

Moreover, as described below, coating was performed on each surface treatment coating, and a corrosion resistance (coated mode) was subsequently conducted to evaluate the corrosion resistance of the resulting coated article. The results thereof are shown in Table 5.

<Metallic Material>

Aluminum die-cast material (JIS-ADC12)

<Degreasing Agent>

A 20 g/L aqueous solution of an alkali degreasing agent (FINECLEANER 315E, manufactured by Nihon Parkerizing Co., Ltd.) was used.

<Pickling Solution>

A pickling solution (mixture) having a sulfuric acid mass concentration of 5 g/L and a hydrofluoric acid mass concentration of 1 g/L was used.

<<Measurement of Parameters>>

<Mass of Metals Per Unit Area>

The mass of metals (Cr, Ti and Zr) per unit area was measured using a scanning X-ray fluorescence spectrometer (ZSX Primus II, manufactured by Rigaku Corporation).

<Carbon-Equivalent Mass Per Unit Area>

The carbon-equivalent mass per unit area was measured using a total organic carbon analyzer (TOC-L, manufactured by Shimadzu Corporation).

<<Production of Metallic Materials Having Surface Treatment Coating>>

The above-described metallic material was immersed in the above-described degreasing agent at 60° C. for 2 minutes, and the surface thereof was cleaned by rinsing with tap water. Next, for those Examples where the pickling step was performed, the metallic material was immersed in the above-described pickling solution at normal temperature for 2 minutes, and the surface thereof was cleaned by rinsing with tap water. Subsequently, each surface treatment agent of Examples and Comparative Examples was sprayed onto or over the surface of the metallic material at the contact temperature shown in Table 4 for a certain contact time to perform the contact step. Thereafter, the metallic material was washed with running tap water (at normal temperature for 30 seconds) and then washed with deionized water (at normal temperature for 30 seconds), followed by drying in an electric oven (at 80° C. for 5 minutes), whereby a metallic material having a surface treatment coating was produced.

<<Evaluation Methods>>
<Corrosion Resistance (Uncoated Mode)>

A 240-hour neutral salt spray test (JIS Z2371:2015) was performed on the thus obtained metallic material having a surface treatment coating. After the metallic material was dried, the ratio of white rust generated on the surface of the metallic material was visually measured. The ratio of white rust is the ratio of the area of generated white rust with respect to the area of the observed part. The evaluation criteria are as follows. The evaluation results are shown in Table 5.

<Evaluation Criteria>
5: Ratio of white rust=10% or lower
4: Ratio of white rust=higher than 10% but 30% or lower
3: Ratio of white rust=higher than 30% but 50% or lower
2: Ratio of white rust=higher than 50% but 70% or lower
1: Ratio of white rust=higher than 70%

<Corrosion Resistance (Coated Mode)>

The surface of the thus obtained metallic material having a surface treatment coating was coated with a solvent-based paint (aminoalkyd-based paint) to form a paint film such that the paint film had a thickness of 20 μm after being dried, whereby a coated material was produced. Subsequently, on the surface of the paint film on the coated material, two intersecting diagonal cuts were made using an acrylic cutter such that the cuts reached the metal base. A 480-hour neutral salt spray test (JIS Z2371:2015) was performed on this coated material. After the coated material was dried, a tape was peeled off from the coated material, and the maximum peeled width of the paint film of the cut portion on one side was measured. The evaluation criteria are as follows. The evaluation results are shown in Table 5.

<Evaluation Criteria>
5: peeled width=0.5 mm or less
4: peeled width=larger than 0.5 mm but 1.0 mm or less
3: peeled width=larger than 1.0 mm but 2.0 mm or less
2: peeled width=larger than 2.0 mm but 3.0 mm or less
1: peeled width=larger than 3.0 mm

TABLE 3

| Surface treatment agent | Supply source (A) Type | Amount (mg/L) | Supply source (B) Type | Amount (mg/L) | Compound (C) Type | (A + B)/C Ratio | Fluorine-containing compound (D) Type | Free fluorine ion concentration (mg/L) | Other component (E) Type | Amount (mg/L) | pH |
|---|---|---|---|---|---|---|---|---|---|---|---|
| Example 1 | A1 | 150 | B1 | 100 | C1 | 3.57 | D1 | 30 | — | — | 4 |
| Example 2 | A2 | 150 | B1 | 100 | C1 | 3.57 | D1 | 30 | — | — | 4 |
| Example 3 | A3 | 150 | B2 | 100 | C1 | 3.57 | D1 | 30 | — | — | 4 |
| Example 4 | A1 | 150 | B1 | 100 | C2 | 3.57 | D1 | 30 | — | — | 4 |
| Example 5 | A1 | 150 | B1 | 100 | C3 | 3.57 | D1 | 30 | — | — | 4 |
| Example 6 | A1 | 5 | B1 | 500 | C1 | 7.21 | D1 | 30 | — | — | 4 |
| Example 7 | A1 | 30 | B1 | 300 | C1 | 4.71 | D1 | 30 | — | — | 4 |
| Example 8 | A1 | 150 | B1 | 5 | C1 | 2.21 | D1 | 30 | — | — | 4 |
| Example 9 | A1 | 50 | B1 | 50 | C1 | 0.02 | D1 | 30 | — | — | 4 |
| Example 10 | A1 | 150 | B1 | 100 | C1 | 0.50 | D1 | 30 | — | — | 4 |
| Example 11 | A1 | 150 | B1 | 100 | C1 | 5.00 | D1 | 30 | — | — | 4 |
| Example 12 | A1 | 150 | B1 | 100 | C1 | 50.00 | D1 | 30 | — | — | 4 |
| Example 13 | A1 | 150 | B1 | 100 | C1 | 3.57 | D1 | 2 | — | — | 4 |
| Example 14 | A1 | 150 | B1 | 100 | C1 | 3.57 | D1 | 150 | — | — | 4 |
| Example 15 | A1 | 150 | B1 | 100 | C1 | 3.57 | D1 | 30 | — | — | 2 |
| Example 16 | A1 | 150 | B1 | 100 | C1 | 3.57 | D1 | 30 | — | — | 5.1 |
| Example 17 | A1 | 150 | B1 | 100 | C1 | 3.57 | D1 | 30 | — | — | 4 |
| Example 18 | A1 | 150 | B1 | 100 | C1 | 3.57 | D1 | 30 | — | — | 4 |
| Example 19 | A1 | 150 | B1 | 100 | C1 | 3.57 | D1 | 30 | E1 | 150 | 4 |
| Example 20 | A1 | 150 | B1 | 100 | C1 | 3.57 | D1 | 30 | E2 | 150 | 4 |
| Comparative Example 1 | — | — | B1 | 100 | C1 | 1.43 | D1 | 30 | — | — | 4 |
| Comparative Example 2 | A1 | 150 | — | — | C1 | 2.14 | D1 | 30 | — | — | 4 |
| Comparative Example 3 | A1 | 150 | B1 | 100 | — | — | D1 | 30 | — | — | 4 |
| Comparative Example 4 | A1 | 150 | B1 | 100 | C4 | 3.57 | D1 | 30 | — | — | 4 |
| Comparative Example 5 | A1 | 150 | B1 | 100 | C5 | 3.57 | D1 | 30 | — | — | 4 |
| Comparative Example 6 | A1 | 150 | B1 | 100 | C6 | 3.57 | D1 | 30 | — | — | 4 |
| Comparative Example 7 | — | — | B1 | 100 | C1 | 1.43 | D1 | 30 | E3 | 150 | 4 |
| Comparative Example 8 | — | — | B1 | 100 | C1 | 1.43 | D1 | 30 | E4 | 150 | 4 |

TABLE 4

| Production Examples of metallic material having surface treatment coating | Used material | Metallic material surface treatment agent | Amount of adhered surface treatment film (mg/m²) | | (N) | (M) | Pickling | Contact temperature (° C.) |
|---|---|---|---|---|---|---|---|---|
| | | | Amount of adhered Cr | Total amount of adhered Ti and Zr | | | | |
| Production Example 1 | JIS-ADC12 | Example 1 | 5 | 20 | 25 | 5 | performed | 50 |
| Production Example 2 | JIS-ADC12 | Example 2 | 5 | 20 | 25 | 5 | performed | 50 |
| Production Example 3 | JIS-ADC12 | Example 3 | 5 | 20 | 25 | 5 | performed | 50 |
| Production Example 4 | JIS-ADC12 | Example 4 | 5 | 20 | 25 | 5 | performed | 50 |
| Production Example 5 | JIS-ADC12 | Example 5 | 5 | 20 | 25 | 5 | performed | 50 |
| Production Example 6 | JIS-ADC12 | Example 6 | 1 | 60 | 61 | 5 | performed | 50 |
| Production Example 7 | JIS-ADC12 | Example 7 | 3 | 40 | 43 | 5 | performed | 50 |
| Production Example 8 | JIS-ADC12 | Example 8 | 2 | 5 | 7 | 5 | performed | 50 |
| Production Example 9 | JIS-ADC12 | Example 9 | 3 | 10 | 13 | 10 | performed | 50 |
| Production Example 10 | JIS-ADC12 | Example 10 | 5 | 20 | 25 | 5 | performed | 50 |
| Production Example 11 | JIS-ADC12 | Example 11 | 5 | 20 | 25 | 5 | performed | 50 |
| Production Example 12 | JIS-ADC12 | Example 12 | 5 | 20 | 25 | 2 | performed | 50 |
| Production Example 13 | JIS-ADC12 | Example 13 | 3 | 10 | 13 | 4 | performed | 50 |
| Production Example 14 | JIS-ADC12 | Example 14 | 5 | 20 | 25 | 5 | performed | 50 |
| Production Example 15 | JIS-ADC12 | Example 15 | 5 | 20 | 25 | 5 | performed | 50 |
| Production Example 16 | JIS-ADC12 | Example 16 | 5 | 20 | 25 | 5 | performed | 50 |
| Production Example 17 | JIS-ADC12 | Example 17 | 5 | 20 | 25 | 5 | performed | 35 |
| Production Example 18 | JIS-ADC12 | Example 18 | 5 | 20 | 25 | 5 | performed | 75 |
| Production Example 19 | JIS-ADC12 | Example 19 | 5 | 20 | 25 | 5 | performed | 50 |
| Production Example 20 | JIS-ADC12 | Example 20 | 5 | 20 | 25 | 5 | performed | 50 |
| Production Example 21 | JIS-ADC12 | Example 1 | 5 | 20 | 25 | 5 | not performed | 50 |
| Production Example 22 | JIS-ADC12 | Example 2 | 5 | 20 | 25 | 5 | not performed | 50 |
| Production Example 23 | JIS-ADC12 | Example 3 | 5 | 20 | 25 | 5 | not performed | 50 |
| Production Example 24 | JIS-ADC12 | Example 4 | 5 | 20 | 25 | 5 | not performed | 50 |
| Production Example 25 | JIS-ADC12 | Example 5 | 5 | 20 | 25 | 5 | not performed | 50 |
| Comparative Production Example 1 | JIS-ADC12 | Comparative Example 1 | 0 | 20 | 20 | 5 | performed | 50 |
| Comparative Production Example 2 | JIS-ADC12 | Comparative Example 2 | 2 | 0 | 2 | 2 | performed | 50 |
| Comparative Production Example 3 | JIS-ADC12 | Comparative Example 3 | 5 | 20 | 25 | 0 | performed | 50 |
| Comparative Production Example 4 | JIS-ADC12 | Comparative Example 4 | 5 | 20 | 25 | 5 | performed | 50 |
| Comparative Production Example 5 | JIS-ADC12 | Comparative Example 5 | 5 | 20 | 25 | 5 | performed | 50 |
| Comparative Production Example 6 | JIS-ADC12 | Comparative Example 6 | 5 | 20 | 25 | 5 | performed | 50 |
| Comparative Production Example 7 | JIS-ADC12 | Comparative Example 7 | 0 | 20 | 20 | 5 | performed | 50 |
| Comparative Production Example 8 | JIS-ADC12 | Example 1 | 0 | 20 | 20 | 5 | performed | 50 |

TABLE 5

| Production Examples of metallic material having surface treatment coating | Used material | Metallic material surface treatment agent | Corrosion resistance | |
|---|---|---|---|---|
| | | | Coated | Uncoated |
| Production Example 1 | JIS-ADC12 | Example 1 | 5 | 5 |
| Production Example 2 | JIS-ADC12 | Example 2 | 5 | 5 |
| Production Example 3 | JIS-ADC12 | Example 3 | 5 | 5 |
| Production Example 4 | JIS-ADC12 | Example 4 | 5 | 5 |
| Production Example 5 | JIS-ADC12 | Example 5 | 5 | 5 |
| Production Example 6 | JIS-ADC12 | Example 6 | 3 | 4 |
| Production Example 7 | JIS-ADC12 | Example 7 | 5 | 5 |
| Production Example 8 | JIS-ADC12 | Example 8 | 3 | 3 |
| Production Example 9 | JIS-ADC12 | Example 9 | 3 | 3 |
| Production Example 10 | JIS-ADC12 | Example 10 | 5 | 5 |
| Production Example 11 | JIS-ADC12 | Example 11 | 5 | 5 |
| Production Example 12 | JIS-ADC12 | Example 12 | 4 | 4 |
| Production Example 13 | JIS-ADC12 | Example 13 | 4 | 3 |
| Production Example 14 | JIS-ADC12 | Example 14 | 3 | 4 |
| Production Example 15 | JIS-ADC12 | Example 15 | 3 | 4 |
| Production Example 16 | JIS-ADC12 | Example 16 | 5 | 3 |
| Production Example 17 | JIS-ADC12 | Example 17 | 3 | 3 |
| Production Example 18 | JIS-ADC12 | Example 18 | 5 | 5 |
| Production Example 19 | JIS-ADC12 | Example 19 | 5 | 5 |
| Production Example 20 | JIS-ADC12 | Example 20 | 5 | 5 |
| Production Example 21 | JIS-ADC12 | Example 1 | 5 | 4 |
| Production Example 22 | JIS-ADC12 | Example 2 | 5 | 4 |
| Production Example 23 | JIS-ADC12 | Example 3 | 5 | 4 |
| Production Example 24 | JIS-ADC12 | Example 4 | 5 | 4 |
| Production Example 25 | JIS-ADC12 | Example 5 | 5 | 4 |
| Compared Production Example 1 | JIS-ADC12 | Comparative Example 1 | 1 | 2 |
| Compared Production Example 2 | JIS-ADC12 | Comparative Example 2 | 1 | 1 |
| Compared Production Example 3 | JIS-ADC12 | Comparative Example 3 | 1 | 2 |
| Compared Production Example 4 | JIS-ADC12 | Comparative Example 4 | 2 | 1 |
| Compared Production Example 5 | JIS-ADC12 | Comparative Example 5 | 1 | 2 |
| Compared Production Example 6 | JIS-ADC12 | Comparative Example 6 | 1 | 2 |

TABLE 5-continued

| Production Examples of metallic material having surface treatment coating | Used material | Metallic material surface treatment agent | Corrosion resistance Coated | Corrosion resistance Uncoated |
|---|---|---|---|---|
| Compared Production Example 7 | JIS-ADC12 | Comparative Example 7 | 1 | 2 |
| Compared Production Example 8 | JIS-ADC12 | Comparative Example 8 | 2 | 1 |

The present invention has been described in detail referring to concrete Examples thereof; however, it is obvious to those skilled in the art that various modifications and changes can be made without departing from the gist and the scope of the present invention.

The invention claimed is:

1. A surface treatment agent for surface-treating a metallic material, the surface treatment agent obtained by mixing:
   at least one supply source (A) of trivalent chromium-containing ions A;
   a supply source (B) of ions B that are at least one selected from titanium-containing ions and zirconium-containing ions;
   a water-soluble or water-dispersible compound (C) comprising an alkoxysilyl group, an aromatic ring, a hydroxy group directly bonded to the aromatic ring, and at least one amino group selected from primary amino groups, secondary amino groups, tertiary amino groups, and quaternary ammonium groups, wherein the alkoxysilyl group is bonded to a nitrogen atom of the amino group directly or via an alkylene group; and
   a fluorine-containing compound (D) capable of providing fluorine-containing ions,
   wherein the surface treatment agent comprises free fluorine ions.

2. The surface treatment agent according to claim 1, wherein a ratio of a total mass of a chromium-equivalent mass of the ions A and a metal-equivalent mass of the ions B with respect to a solid content mass of the compound (C), [(A+B)/C], is in a range of 0.03 to 100.

3. A method of producing a metallic material having a surface treatment coating, the method comprising [[the]] a contact step of bringing the surface treatment agent according to claim 1 into contact with or over a surface of a metallic material.

4. The method of producing a metallic material having a surface treatment coating according to claim 3, the method further comprising, prior to the contact step, a pickling step of pickling the metallic material with a pickling solution that is obtained by mixing at least one compound selected from a fluorine-containing compound, a sulfuric acid compound, a nitric acid compound, a phosphoric acid compound, an oxycarboxylic acid compound, and a hydrogen peroxide compound.

5. A metallic material, comprising a surface treatment coating formed by bringing the surface treatment agent according to claim 1 into contact with or over a surface of the metallic material.

* * * * *